United States Patent
Huntley et al.

(10) Patent No.: US 10,999,284 B2
(45) Date of Patent: *May 4, 2021

(54) PROTECTING SUPERVISOR MODE INFORMATION

(71) Applicant: Intel Corporation, Santa Clara, CA (US)

(72) Inventors: Barry E. Huntley, Hillsboro, OR (US); Gilbert Neiger, Portland, OR (US); H. Peter Anvin, San Jose, CA (US); Asit K. Mallick, Saratoga, CA (US); Adriaan Van De Ven, Portland, OR (US); Scott D. Rodgers, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/084,406

(22) Filed: Oct. 29, 2020

(65) Prior Publication Data

US 2021/0051149 A1    Feb. 18, 2021

Related U.S. Application Data

(63) Continuation of application No. 16/194,648, filed on Nov. 19, 2018, which is a continuation of application
(Continued)

(51) Int. Cl.
*G06F 21/00*    (2013.01)
*H04L 29/06*    (2006.01)
*G06F 21/74*    (2013.01)

(52) U.S. Cl.
CPC .............. *H04L 63/10* (2013.01); *G06F 21/74* (2013.01); *H04L 63/1433* (2013.01)

(58) Field of Classification Search
CPC ..... H04L 63/10; H04L 63/1433; G06F 21/74; G06F 21/577
(Continued)

(56) References Cited

U.S. PATENT DOCUMENTS

| 5,685,009 A | 11/1997 | Blomgren et al. |
| 6,745,307 B2* | 6/2004 | McKee .............. G06F 12/1475 711/163 |
| 9,021,605 B2* | 4/2015 | Blue .................. G06F 21/6281 726/28 |

OTHER PUBLICATIONS

Advisory Action from U.S. Appl. No. 14/582,829, dated May 7, 2018, 3 pages.
(Continued)

*Primary Examiner* — Longbit Chai
(74) *Attorney, Agent, or Firm* — Nicholson De Vos Webster & Elliott LLP

(57) ABSTRACT

Embodiments of an invention for protecting supervisor mode information are disclosed. In one embodiment, an apparatus includes a storage location, instruction hardware, execution hardware, and control logic. The storage location is to store an indicator to enable supervisor mode information protection. The instruction hardware is to receive an instruction to access supervisor mode information. The execution hardware is to execute the instruction. The control logic is to prevent execution of the instruction if supervisor mode information protection is enabled and a current privilege level is less privileged than a supervisor mode.

30 Claims, 3 Drawing Sheets

Related U.S. Application Data

No. 14/582,829, filed on Dec. 24, 2014, now Pat. No. 10,135,825.

(58) Field of Classification Search
USPC .......................................................... 726/4
See application file for complete search history.

(56) References Cited

OTHER PUBLICATIONS

Advisory Action from U.S. Appl. No. 14/582,829, dated Sep. 6, 2017, 2 pages.
Anababa "Simple Is Better: Kernel Information Leak with Unprivileged Instructions (SIDT, SGDT) on x86—WHY?", ASLR, Security, x86, Available Online at <http://hypervsir.blogspot.com/2014/10/kernel-information-leak-with.html>, Jul. 14, 2014, 2 pages.
Bugnion et al., "Bringing Virtualization to the x86 Architecture with the Original VMware Workstation", ACM Transactions on Computer Systems, vol. 30, No. 4, Article 12, Nov. 2012, 51 pages.
Final Office Action from U.S. Appl. No. 14/582,829, dated Feb. 27, 2018, 12 pages.
Final Office Action from U.S. Appl. No. 14/582,829, dated Jun. 26, 2017, 11 pages.
Final Office Action from U.S. Appl. No. 14/582,829, dated Sep. 27, 2016, 8 pages.
Intel, "Intel (registered) 64 and IA-32 Architectures Software Developer's Manual", vol. 2 (2A, 28 & 2C): Instruction Set Reference, A-Z, Order No. 325383-051US, Jun. 2014, 34 pages.
Non-Final Office Action from U.S. Appl. No. 14/582,829, dated Mar. 1, 2017, 14 pages.
Non-Final Office Action from U.S. Appl. No. 14/582,829, dated Mar. 22, 2016, 8 pages.
Non-Final Office Action from U.S. Appl. No. 14/582,829, dated Oct. 27, 2017, 12 pages.
Non-Final Office Action, U.S. Appl. No. 16/194,648, dated Aug. 7, 2020, 9 pages.
Notice of Allowance from U.S. Appl. No. 14/582,829, dated Jul. 30, 2018, 11 pages.
Robin et al., "Analysis of the Intel Pentium's Ability to Support a Secure Virtual Machine Monitor", Proceedings of the 9th conference on USENIX Security Symposium, vol. 9, Aug. 2000, 16 pages.
Notice of Allowance, U.S. Appl. No. 16/194,648, dated Feb. 8, 2021, 11 pages.

\* cited by examiner

METHOD 300

PROTECTING SUPERVISOR MODE INFORMATION

BACKGROUND

1. Field

The present disclosure pertains to the field of information processing, and more particularly, to the field of security in information processing systems.

2. Description of Related Art

A processor in an information processing system may support two or more privilege levels to provide for software operating at a higher privilege level to access data and/or transfer control to software at a lower privilege level, but not vice versa, except under certain conditions. Each such privilege level may be referred to as a mode. For example, a higher privilege level may be referred to as supervisor mode and a lower privilege level may be referred to as user mode, where supervisor mode may be intended for use by system level software such as an operating system (OS) and user mode may be intended for use by user level software such as an application program.

BRIEF DESCRIPTION OF THE FIGURES

The present invention is illustrated by way of example and not limitation in the accompanying figures.

DETAILED DESCRIPTION

Embodiments of an invention for protecting supervisor mode information are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a "/" character between terms may mean that an embodiment may include or be implemented using, with, and/or according to the first term and/or the second term (and/or any other additional terms).

As described in the background section, a processor may support two or more privilege levels or modes. The use of embodiments of the present invention may be desired in order to protect supervisor mode information stored within the processor and therefore reduce the vulnerability of the processor to malicious attacks.

Figure 1:
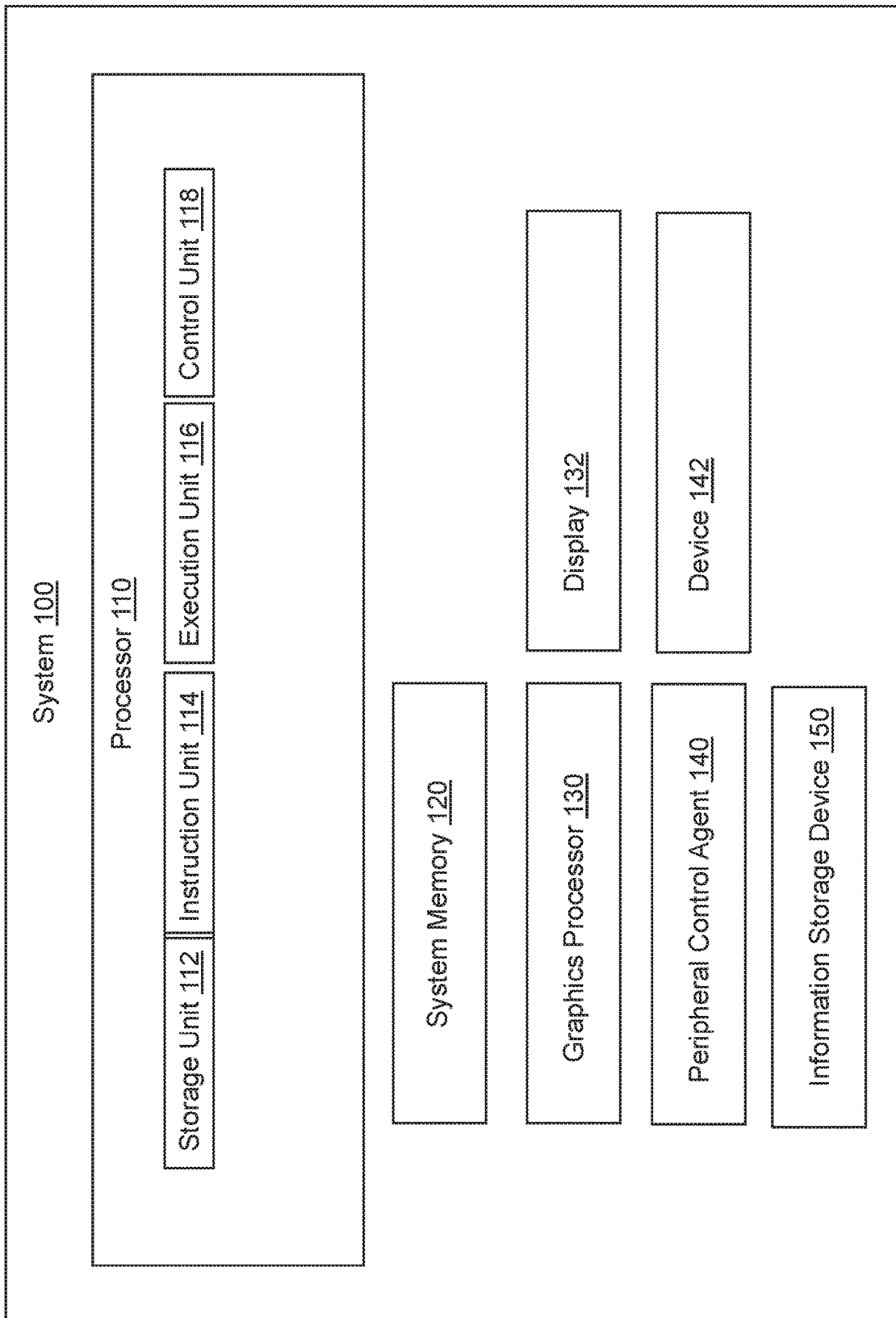
FIG. 1 illustrates a system including an embodiment of the present invention for protecting supervisor mode information.

FIG. 1 illustrates system 100, an information processing system including an embodiment of the present invention for protecting supervisor mode information. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, and information storage device 150. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory or any other type of medium readable by processor 110. Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.) and/or information storage device 150, may be connected or coupled to processor 110. Information storage device 150 may include any type of persistent or non-volatile memory or storage, such as a flash memory and/or a solid state, magnetic, or optical disk drive.

Processor 110 may represent one or more processors or processor cores integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented.

Processor 110 may include storage unit 112, instruction unit 114, execution unit 116, and control unit 118, each as described below. Processor 110 may also include any other circuitry, structures, or logic not shown in FIG. 1. Furthermore, the functionality and or circuitry of each of the described and/or illustrated units of processor 110 may be combined and/or distributed in any manner.

Storage unit 112 may include any combination of any type of storage usable for any purpose within processor 110; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 110, as well as circuitry usable to access such storage.

Instruction unit 114 may include any circuitry, logic, structures, and/or other hardware, such as an instruction decoder, to fetch, receive, decode, interpret, schedule, and/or handle instructions to be executed by processor 110. Any instruction format may be used within the scope of the present invention; for example, an instruction may include an opcode and one or more operands, where the opcode may be decoded into one or more micro-instructions or micro-operations for execution by execution unit 116. Operands or other parameters may be associated with an instruction implicitly, directly, indirectly, or according to any other approach.

Execution unit 116 may include any circuitry, logic, structures, and/or other hardware, such as arithmetic units, logic units, floating point units, shifters, etc., to process data and execute instructions, micro-instructions, and/or micro-operations. Execution unit 116 may represent any one or more physically or logically distinct execution units.

Control unit 118 may include any microcode, firmware, circuitry, logic, structures, and/or hardware to control the operation of the units and other elements of processor 110 and the transfer of data within, into, and out of processor 110.

Figure 2:
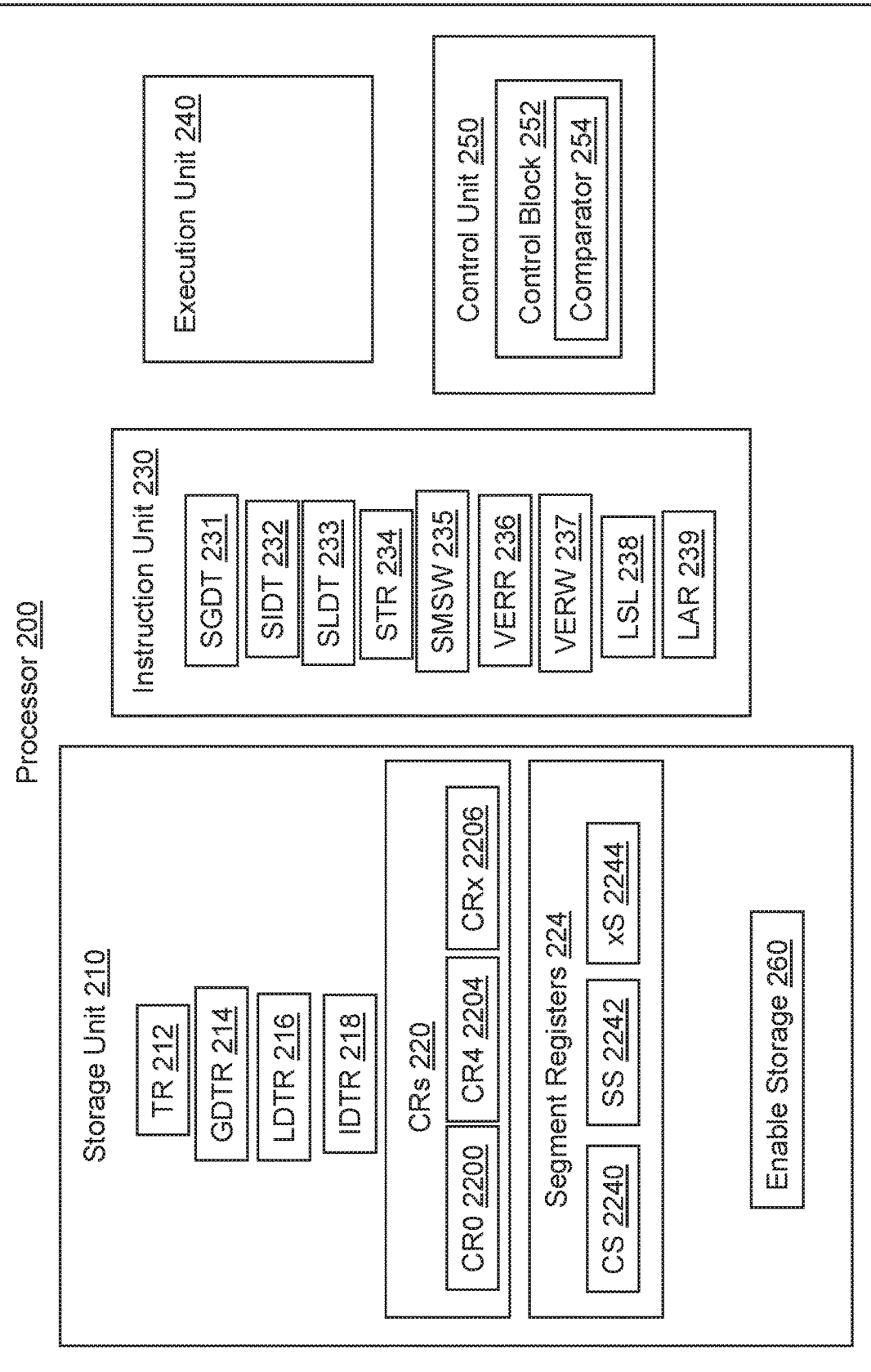
FIG. 2 illustrates a processor according to an embodiment of the present invention for protecting supervisor mode information.

FIG. 2 illustrates processor 200, which may represent an embodiment of processor 110 in FIG. 1. Processor 200 may include any number of registers or other storage locations, for example, in storage unit 210 (which may represent an embodiment of storage unit 112 in processor 110), which may be used to store information intended for use by an OS or other system level software, including addresses, descriptors, selectors, access information, usage information, and/or other information of, regarding, or otherwise associated with data and/or data structures used and/or to be used for memory management, interrupt and exception handling, task management, control of multiple processors, and/or other system level operations. Information stored and/or to be stored in any these registers, storage locations, and/or data structures may be referred to as supervisor mode information.

In an embodiment in which processor 200 is a processor in the Intel® Core® Processor Family or may operate according to an instruction set architecture compatible with a processor in the Intel® Core® Processor Family, storage unit 210 may include task register (TR) 212, global descriptor table register (GDTR) 214, local descriptor table register (LDTR) 216, interrupt descriptor table register (IDTR) 218, any number of control registers (each, a CR) 220 (including CR0 2202, CR4 2204, as well as CR1, CR2, CR3, CR8, XCR0, and any other control registers, any of which may be represented by CRx 2206), and any number of segment registers 224 (including a code-segment register CS 2240, a stack-segment register SS 2242, as well as data-segment register DS, ES, FS, and GS and any other segment registers, any of which may be represented by xS 2244).

Processor 200 also includes support for executing software including instructions to read, copy, store, load, or otherwise access supervisor mode information from TR 212, GDTR 214, LDTR 216, IDTR 218, CR0 2202, CR4 2204, CRx 2206, CS 2240, SS 2242, xS 2244, and/or any other register or storage location in or accessible to processor 200. Such support may be implemented in processor 200 using any combination of circuitry and/or logic embedded in hardware, microcode, firmware, and/or other structures contained in and/or distributed among instruction unit 230 (which may represent an embodiment of instruction unit 114 in processor 110), execution unit 240 (which may represent an embodiment of execution unit 116 in processor 110), control unit 250 (which may represent an embodiment of control unit 118 in processor 110), and/or elsewhere in processor 200. For convenience, such support may be represented by blocks within instruction unit 230).

In an embodiment in which processor 200 is a processor in the Intel® Core® Processor Family or may operate according to an instruction set architecture compatible with a processor in the Intel® Core® Processor Family, such support may include support for instructions, as further described below and represented by SGDT block 231, SIDT block 232, SLDT block 233, STR block 234, SMSW block 235, VERR block 236, VERW block 237, LSL block 238, and LAR block 239. Although each such block and the corresponding instruction is referred to using an instruction name in the instruction set architecture of a processor family from Intel® Corporation, instructions for accessing supervisor mode information may have any names in various embodiments of the present invention.

SGDT block 231 may represent support for a first instruction (SGDT) to store the content of GDTR 214, for example in a memory location (e.g., in system memory 120) specified by a destination operand. SIDT block 232 may represent support for a second instruction (SIDT) to store the content of IDTR 218, for example in a memory location (e.g., in system memory 120) specified by a destination operand. SLDT block 233 may represent support for a third instruction (SLDT) to store the segment selector from LDTR 216, for example in a general purpose register (e.g., in storage unit 210) or a memory location (e.g., in system memory 120) specified by a destination operand.

STR block 234 may represent support for a fourth instruction (STR) to store the segment selector from TR 212, for example in a general purpose register (e.g., in storage unit 210) or a memory location (e.g., in system memory 120) specified by a destination operand. SMSW block 235 may represent support for a fifth instruction (SMSW) to store the machine status work (e.g., from bits 0 through 15 of CR0 222), for example in a general purpose register (e.g., in storage unit 210) or a memory location (e.g., in system memory 120) specified by a destination operand.

VERR block 236 may represent support for a sixth instruction (VERR) to verify a segment for reading, for example to verify whether the code or data segment specified by a segment selector in a register (e.g., one of segment registers 224) or a memory location (e.g., in system memory 120) specified by a source operand is readable from the current privilege level, set flag if so, and clear the flag if not. VERW block 237 may represent support for a seventh instruction (VERW) to verify a segment for writing, for example to verify whether the data segment specified by a segment selector in a register (e.g., one of segment registers 224) or a memory location (e.g., in system memory 120) specified by a source operand is writable from the current privilege level, set flag if so, and clear the flag if not.

LSL block 238 may represent support for an eighth instruction (LSL) to load a segment limit, for example to load the segment limit from the segment descriptor specified by a segment selector in a register (e.g., one of segment registers 224) or a memory location (e.g., in system memory 120) specified by a source operand into a general purpose register (e.g., in storage unit 210) specified by a destination operand. LAR block 239 may represent support for a ninth instruction (LAR) to load an access rights byte, for example to load the access rights from the segment descriptor specified by a segment selector in a register (e.g., one of segment registers 224) or a memory location (e.g., in system memory 120) specified by a source operand into a general purpose register (e.g., in storage unit 210) specified by a destination operand.

Processor 200 may in addition or instead include support for any number of other instructions for accessing supervisor mode information, since embodiments of the present invention may be practiced with a processor having any instruction set architecture and are not limited to an architecture of a processor family from Intel® Corporation.

Storage unit 210 may also include one or more supervisor mode protection enable locations 260. Each such location may be designated to store a bit, bit vector, group of bits, or other indicator (enable bit) to be used to control whether a corresponding instruction is executable from one or more privilege levels. Each such location may be within a register or storage location described above, within a register or storage location provided according to the existing architecture of the processor, and/or within a new register or storage location. Each such location may be inaccessible to user level software. For example, in an embodiment, each such location may be programmable from supervisor mode only. In another embodiment, each such location may be within a non-volatile memory that may be configured by system firmware and/or a system or device manufacturer or supplier.

Embodiments may include a global enable bit to provide for enabling supervisor mode protection. For example, if the global enable bit is set, no instruction that provides or provide access to supervisor mode information (e.g., SGDT, SIDT, SLDT, STR, SMSW, VERR, VERW, LSL, LAR, etc.) is executable unless the current privilege level (CPL) corresponds to supervisor mode (e.g., ring 0 in an architecture of a processor family from Intel® Corporation). Embodiments may include one or more group enable bits, each to provide for enabling supervisor mode protection for a group of instructions. The definition of a group (i.e., which instructions it includes) may be architecturally specified or may be programmable. Embodiments may include one or more individual enable bits, each to provide for enabling supervisor mode protection for a single, corresponding instruction. Various combinations of these embodiments and/or various other embodiments are possible within the scope of the present invention. In embodiments in which multiple enable bits correspond to a single instruction (for example, an instruction having an individual enable bit might also be included in a group and/or controlled by a global enable bit) any control arrangement may be used (for example, supervisor mode protection may be enabled if any one such bit is set, if a specific one of such bits are set regardless of the others, only if all such bits are set, if any combination of such bits are set, etc.).

Furthermore, embodiments may include one more of these enable bits to specify the privilege levels from which an instruction is executable. An embodiment may include one or more global, group, and/or individual enable fields, where each such field may be used to specify one or more privilege levels. An embodiment may include one bit in each such field, and if the bit is set, a corresponding instruction is executable only from a highest privilege level (e.g., ring 0 in an architecture of a processor family from Intel® Corporation). An embodiment may include one bit in each such field, and if the bit is set, a corresponding instruction is executable only from two or more highest privilege levels. An embodiment may include, in each such field, one bit per privilege level above a lowest privilege level, such that if a bit is set, a corresponding instruction is executable only from the corresponding or a higher privilege level. An embodiment may include, in each such field, storage for a value corresponding to a privilege level, such that a corresponding instruction is executable only from the privilege level represented by that value or a higher privilege level. Various combinations of these embodiments and/or various other embodiments are possible within the scope of the present invention.

Control unit 250 includes supervisor mode protection control block 252, which may represent any microcode, firmware, circuitry, logic, structures, and/or hardware to control the execution of instructions subject to supervisor mode protection according to an embodiment of the present invention, and to perform or cause to be performed method embodiments of the present invention and/or portions of method embodiments.

Control block 252 may have access to supervisor mode protection enable location 260 and a CPL storage location (e.g., bits 0 and 1 of CS 226 and/or SS 228), the content of which indicates the CPL of processor 200. Although these storage locations are shown in storage unit 210, any or all of the indicators to be used by control block 252 may be stored or shadowed within control block 252 or anywhere else in processor 200.

Control block 252 may also include comparator 254 or other circuitry or hardware to compare the CPL to the privilege level from which an instruction is executable, as may be indicated by content from supervisor mode protection enable location 260, or otherwise determine whether an instruction is executable from the CPL. Although such circuitry or hardware is shown and referred to as comparator 254, a comparison may not be necessary to determine whether an instruction is executable from the CPL. For example, in an embodiment with only a global enable bit and a two-bit value for a CPL, the determination may be made using a single three-input boolean gate.

A determination made by control block 252 may be used to prevent an instruction (that would otherwise provide or provide access to supervisor mode information) from executing. In other words, if supervisor mode protection is enabled, the instruction is only executable if control block 252 determines that the CPL is equal to or more privileged than a supervisor mode, where the supervisor mode may be defined or programmed to be any desired privilege level (whether or not that privilege level is used or intended to be used by OS, system level, or supervisor code).

The determination may be used to cause a fault (e.g., a general protection fault) to be generated if supervisor mode protection is enabled for an instruction and an attempt is made to execute the instruction from a CPL less privileged than a supervisor mode.

The determination may also or instead be used to take or cause any other desired action. In an embodiment, in response to a determination that supervisor mode protection is enabled for an instruction and an attempt is made to execute the instruction from a CPL less privileged than a supervisor mode, instead of preventing execution of the instruction and/or generating a fault, control block 252 may cause bogus or default information (or information other than the actual supervisor mode information that the instruction is attempting to access) to be returned. In an embodiment, this bogus information may be a fixed value such as all zeroes. In an embodiment, this bogus information may be a programmable (e.g., by supervisor code) value, for example it may be read, copied, stored, loaded, or otherwise accessed from a designated (fixed or programmable) storage location in storage unit 210 or system memory 120 after having been written or stored there by supervisor code during a setup or configuration process.

Figure 3:
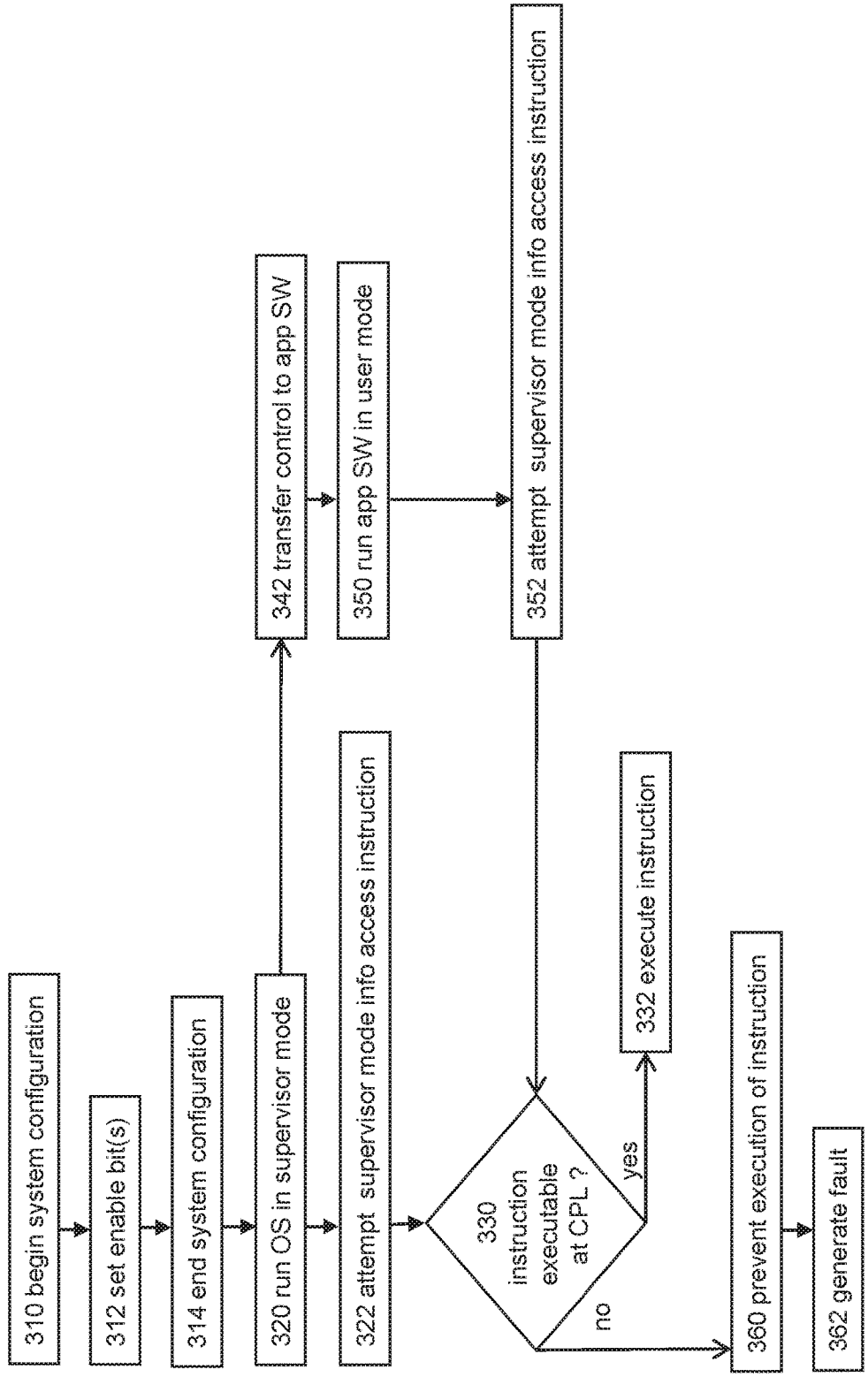
FIG. 3 illustrates a method for protecting supervisor mode information according to an embodiment of the present invention.

FIG. 3 illustrates method 300 for protecting supervisor mode information according to an embodiment of the present invention. Although method embodiments of the invention are not limited in this respect, reference may be made to elements of FIGS. 1 and 2 to help describe the method embodiment of FIG. 3. Various portions of method 300 may be performed by hardware, firmware, software, and/or a user of a system.

In box 310 of method 300, configuration of an information processing system (e.g. system 100) begins. The configuration may be part of an initialization, reset, boot, and/or other process, and may be performed by a basic input/output system, an OS, and/or other system level software or firmware.

In box 312, one or more supervisor mode protection enable bits (e.g., in storage location 260) may be set, for example to enable supervisor mode protection. In box 314, configuration may end.

In box 320, an OS or other system software may begin or continue to operate or run in a supervisor mode (e.g., ring 0). From box 320, method 300 may continue in box 322 or box 342. In box 322, an attempt to execute an instruction to access supervisor mode information from supervisor mode may begin. From box 322, method 300 continues in box 330.

In box 342, the OS or other system software running in supervisor mode may transfer control to application or other software to operate or run in user mode (e.g., ring 3). In box 350, the application or other software may begin to operate or run in user mode. In box 352, an attempt to execute an instruction to access supervisor mode information from user mode may begin. From box 352, method 300 continues in box 330.

In box 330, a determination may be made (e.g., by control block 252) as to whether the instruction is executable at the CPL. If so, then in block 332, the instruction is executed. If not, then in block 360, execution of the instruction is prevented, and in block 362, a fault is generated. Boxes 360 and/or 362 may be replaced or supplemented by any other desired actions, such as returning bogus information.

In various embodiments of the present invention, the method illustrated in FIG. 3 may be performed in a different order, with illustrated boxes combined or omitted, with additional boxes added, or with a combination of reordered, combined, omitted, or additional boxes. Furthermore, method embodiments of the present invention are not limited to method 300 or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of method 300 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for protecting supervisor mode information have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A computer chip package for protecting supervisor mode information, comprising:
   a processor device, the processor device comprising:
      a plurality of storage registers, including:
         a global descriptor table register (GDTR);
         an interrupt descriptor table register (IDTR);
         a local descriptor table register (LDTR);
         a task register (TR);
         a CR0 control register; and
         a first register;
      an instruction decoder to decode instructions, including a first instruction, a second instruction, a third instruction, a fourth instruction, and a fifth instruction of a plurality of supervisor mode information access instructions; and
      one or more execution units, the one or more execution units to execute:
         the first instruction to store content of the GDTR to a memory location as a destination to be specified by a destination operand of the first instruction;
         the second instruction to store content of the IDTR to a memory location as a destination to be specified by a destination operand of the second instruction;
         the third instruction to store a segment selector of the LDTR to a general-purpose register or a memory location as a destination to be specified by a destination operand of the third instruction;

the fourth instruction to store a segment selector of the TR to a general-purpose register or a memory location as a destination to be specified by a destination operand of the fourth instruction; and the fifth instruction to store machine status from bits 0 through 15 of the CR0 control register to a general-purpose register or a memory location as a destination to be specified by a destination operand of the fifth instruction;

the first register to store a plurality of bits to enable respective protections against execution of the plurality of supervisor mode information access instructions based on a privilege level, the plurality of bits including a bit to be set to one to enable a protection or cleared to zero to disable the protection, wherein the first register is inaccessible to user level software; and a control unit coupled with the first register, the control unit, responsive to the bit being set to one, to cause a general protection fault when execution of any one of the first, the second, the third, the fourth, and the fifth instructions of the plurality of supervisor mode information access instructions is attempted, and a current privilege level is less privileged than a highest privilege level of the processor device; and a chipset component to couple input/output devices to the processor device.

2. The computer chip package of claim 1, wherein the one or more execution units are to execute a sixth instruction to verify whether a code or data segment specified by a segment selector in a register or memory operand specified by a source operand is readable from the current privilege level, and set a flag if so or clear the flag if not, and wherein the control unit, responsive to the bit being set to one, is not to cause a general protection fault when execution of the sixth instruction is attempted, and the current privilege level is less privileged than the highest privilege level of the processor device.

3. The computer chip package of claim 1, wherein the one or more execution units are to execute a sixth instruction to verify whether a data segment specified by a segment selector in a register or memory operand specified by a source operand is writable from the current privilege level, and set a flag if so or clear the flag if not, and wherein the control unit, responsive to the bit being set to one, is not to cause a general protection fault when execution of the sixth instruction is attempted, and the current privilege level is less privileged than the highest privilege level of the processor device.

4. The computer chip package of claim 1, wherein the one or more execution units are to execute an sixth instruction to load a segment limit from a segment descriptor specified by a register or a memory location into a general-purpose register, and wherein the control unit, responsive to the bit being set to one, is not to cause a general protection fault when execution of the sixth instruction is attempted, and the current privilege level is less privileged than the highest privilege level of the processor device.

5. The computer chip package of claim 1, wherein the one or more execution units are to execute an sixth instruction to load an access rights byte from a segment descriptor specified by a register or a memory location into a general-purpose register, and wherein the control unit, responsive to the bit being set to one, is not to cause a general protection fault when execution of the sixth instruction is attempted, and the current privilege level is less privileged than the highest privilege level of the processor device.

6. The computer chip package of claim 1, wherein the plurality of storage registers also includes a code segment register (CS), and wherein bits of the CS are to indicate the current privilege level.

7. The computer chip package of claim 1, wherein the highest privilege level of the processor device is a ring 0 privilege level.

8. The computer chip package of claim 1, wherein the first instruction is an SGDT instruction.

9. The computer chip package of claim 1, wherein the second instruction is an SIDT instruction.

10. The computer chip package of claim 1, wherein the third instruction is an SLDT instruction.

11. The computer chip package of claim 1, wherein the fourth instruction is an STR instruction.

12. The computer chip package of claim 1, wherein the fifth instruction is an SMSW instruction.

13. A computer chip package for protecting supervisor mode information, comprising:

a processor device, the processor device comprising:

a plurality of storage registers, including:

a global descriptor table register (GDTR);

an interrupt descriptor table register (IDTR);

a local descriptor table register (LDTR);

a task register (TR);

a CR0 control register; and a first register;

an instruction decoder to decode instructions, including a first instruction, a second instruction, a third instruction, a fourth instruction, and a fifth instruction of a plurality of supervisor mode information access instructions; and one or more execution units, the one or more execution units to execute:

the first instruction to store content of the GDTR to a memory location as a destination to be specified by a destination operand of the first instruction;

the second instruction to store content of the IDTR to a memory location as a destination to be specified by a destination operand of the second instruction;

the third instruction to store a segment selector of the LDTR to a general-purpose register or a memory location as a destination to be specified by a destination operand of the third instruction;

the fourth instruction to store a segment selector of the TR to a general-purpose register or a memory location as a destination to be specified by a destination operand of the fourth instruction; and the fifth instruction to store machine status from bits 0 through 15 of the CR0 control register to a general-purpose register or a memory location as a destination to be specified by a destination operand of the fifth instruction;

the first register to store a plurality of bits to enable respective protections against execution of the plurality of supervisor mode information access instructions based on a privilege level, the plurality of bits including a bit to be set to one to enable a protection or cleared to zero to disable the protection, wherein the first register is inaccessible to user level software; and a control unit coupled with the first register, the control unit, responsive to the bit being set to one, to cause a general protection fault when execution of any one of the first, the second, the third, the fourth, and the fifth instructions of the plurality of supervisor mode information access instructions is attempted, and a current privilege level is less privileged than a highest privilege level of the processor device; and a peripheral control agent to couple an input/output device, a network adapter, and an information storage device to the processor device.

14. The computer chip package of claim 13, wherein the one or more execution units are to execute a sixth instruction to verify whether a code or data segment specified by a segment selector in a register or memory operand specified by a source operand is readable from the current privilege level, and set a flag if so or clear the flag if not, and wherein the control unit, responsive to the bit being set to one, is not to cause a general protection fault when execution of the sixth instruction is attempted, and the current privilege level is less privileged than the highest privilege level of the processor device.

15. The computer chip package of claim 13, wherein the one or more execution units are to execute an sixth instruction to load a segment limit from a segment descriptor specified by a register or a memory location into a general-purpose register, and wherein the control unit, responsive to the bit being set to one, is not to cause a general protection fault when execution of the sixth instruction is attempted, and the current privilege level is less privileged than the highest privilege level of the processor device.

16. The computer chip package of claim 13, wherein the plurality of storage registers also includes a code segment register (CS), and wherein bits of the CS are to indicate the current privilege level.

17. The computer chip package of claim 13, wherein the highest privilege level of the processor device is a ring 0 privilege level.

18. The computer chip package of claim 13, wherein the first instruction is an SGDT instruction, the second instruction is an SIDT instruction, the third instruction is an SLDT instruction, the fourth instruction is an STR instruction, and the fifth instruction is an SMSW instruction.

19. A system for protecting supervisor mode information, comprising:
package comprising:
a processor device, the processor device comprising:
a plurality of storage registers, including:
a global descriptor table register (GDTR);
an interrupt descriptor table register (IDTR);
a local descriptor table register (LDTR);
a task register (TR);
a CR0 control register; and
a first register;
an instruction decoder to decode instructions, including a first instruction, a second instruction, a third instruction, a fourth instruction, and a fifth instruction of a plurality of supervisor mode information access instructions; and
one or more execution units, the one or more execution units to execute:
the first instruction to store content of the GDTR to a memory location as a destination to be specified by a destination operand of the first instruction;
the second instruction to store content of the IDTR to a memory location as a destination to be specified by a destination operand of the second instruction;
the third instruction to store a segment selector of the LDTR to a general-purpose register or a memory location as a destination to be specified by a destination operand of the third instruction;
the fourth instruction to store a segment selector of the TR to a general-purpose register or a memory location as a destination to be specified by a destination operand of the fourth instruction; and
the fifth instruction to store machine status from bits 0 through 15 of the CR0 control register to a general-purpose register or a memory location as a destination to be specified by a destination operand of the fifth instruction;
the first register to store a plurality of bits to enable respective protections against execution of the plurality of supervisor mode information access instructions based on a privilege level, the plurality of bits including a bit to be set to one to enable a protection or cleared to zero to disable the protection, wherein the first register is inaccessible to user level software; and
a control unit coupled with the first register, the control unit, responsive to the bit being set to one, to cause a general protection fault when execution of any one of the first, the second, the third, the fourth, and the fifth instructions of the plurality of supervisor mode information access instructions is attempted, and a current privilege level is less privileged than a highest privilege level of the processor device; and
a chipset component to couple input/output devices to the processor device; and
a system memory coupled with the processor device.

20. The system of claim 19, wherein the one or more execution units are to execute a sixth instruction to verify whether a code or data segment specified by a segment selector in a register or memory operand specified by a source operand is readable from the current privilege level, and set a flag if so or clear the flag if not, and wherein the control unit, responsive to the bit being set to one, is not to cause a general protection fault when execution of the sixth instruction is attempted, and the current privilege level is less privileged than the highest privilege level of the processor device.

21. The system of claim 19, wherein the one or more execution units are to execute an sixth instruction to load a segment limit from a segment descriptor specified by a register or a memory location into a general-purpose register, and wherein the control unit, responsive to the bit being set to one, is not to cause a general protection fault when execution of the sixth instruction is attempted, and the current privilege level is less privileged than the highest privilege level of the processor device.

22. The system of claim 19, wherein the plurality of storage registers also includes a code segment register (CS), and wherein bits of the CS are to indicate the current privilege level.

23. The system of claim 19, wherein the highest privilege level of the processor device is a ring 0 privilege level.

24. The system of claim 19, wherein the first instruction is an SGDT instruction, the second instruction is an SIDT instruction, the third instruction is an SLDT instruction, the fourth instruction is an STR instruction, and the fifth instruction is an SMSW instruction.

25. The system of claim 19, wherein the system memory comprises a dynamic random-access memory.

26. The system of claim 19, further comprising a graphics processor coupled with the processor device.

27. The system of claim 19, further comprising a network adapter coupled with the processor device.

28. The system of claim 19, further comprising an information storage device coupled with the processor device.

29. A processor device for protecting supervisor mode information, comprising:
   a first register to store a plurality of bits to enable respective protections against execution of a plurality of a plurality of supervisor mode information access instructions based on a privilege level, wherein the plurality of bits includes a bit to be set to one to enable a protection or cleared to zero to disable the protection, wherein the bit it inaccessible to user level software;
   an instruction decoder; and
   an execution unit coupled to the first register and the instruction decoder, the instruction decoder to decode a first instruction of the plurality of supervisor mode information access instructions for execution by the execution unit;
     wherein, if a corresponding bit of the plurality of bits is set to one and a current privilege level is less privileged than a highest privilege level of the processor device, attempted execution of the first instruction is to cause a general protection fault; and
     wherein the plurality of supervisor mode information access instructions includes:
       an SGDT (Store Global Descriptor Table) instruction to store content of a global descriptor table register (GDTR) to a memory location as a destination to be specified by a destination operand of the SGDT instruction, and
       an SIDT (Store Interrupt Descriptor Table) instruction to store content of an interrupt descriptor table register (IDTR) to a memory location as a destination to be specified by a destination operand of the SIDT instruction.

30. The processor device of claim 29, wherein the plurality of supervisor mode information access instructions further includes:
   an SLDT (Store Local Descriptor Table) instruction to store a segment selector of a local descriptor table register (LDTR) to a general-purpose register or a memory location as a destination to be specified by a destination operand of the SLDT instruction,
   an STR (Store Task Register) instruction to store a segment selector of a task register (TR) to a general-purpose register or a memory location as a destination to be specified by a destination operand of the STR instruction, or
   an SMSW (Store Machine Status Word) instruction to store machine status from bits 0 through 15 of a CR0 control register to a general-purpose register or a memory location as a destination to be specified by a destination operand of the SMSW instruction.

\* \* \* \* \*